(12) United States Patent
Phillips et al.

(10) Patent No.: US 7,385,588 B2
(45) Date of Patent: Jun. 10, 2008

(54) KEYBOARD ILLUMINATION SYSTEM AND METHOD

(75) Inventors: Quintin T. Phillips, Boise, ID (US); John W. Huffman, Meridian, ID (US); L. Joy Griebenow, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/044,776

(22) Filed: Jan. 27, 2005

(65) Prior Publication Data

US 2006/0164378 A1 Jul. 27, 2006

(51) Int. Cl.
*G09G 5/00* (2006.01)

(52) U.S. Cl. ............... 345/168; 345/169; 345/170; 345/171; 345/173; 345/103

(58) Field of Classification Search ........... 345/168, 345/169–173, 102
See application file for complete search history.

(56) References Cited

U.S. PATENT DOCUMENTS

| 5,379,201 | A | 1/1995 | Friedman |
| 5,684,513 | A | 11/1997 | Decker |
| 5,793,358 | A | 8/1998 | Petkovic et al. |
| 5,815,225 | A * | 9/1998 | Nelson .................. 349/65 |
| 5,868,487 | A | 2/1999 | Polley et al. |
| 6,040,822 | A | 3/2000 | Decker |
| 6,145,992 | A | 11/2000 | Wattenburg |
| 6,161,944 | A | 12/2000 | Leman |
| 6,561,668 | B2 | 5/2003 | Katayama et al. |
| 7,236,154 | B1 * | 6/2007 | Kerr et al. ............ 345/102 |
| 2002/0064055 | A1 | 5/2002 | Takahashi et al. |
| 2002/0085371 | A1 | 7/2002 | Katayama et al. |

* cited by examiner

*Primary Examiner*—Richard Hjerpe
*Assistant Examiner*—Leonid Shapiro

(57) ABSTRACT

A keyboard illumination system comprises a computer device having a plurality of liquid crystal displays (LCDs). The system also comprises a display controller adapted to change an electrical state of at least one of the LCDs for providing a predetermined level of illumination by the at least one LCD for illuminating at least a portion of a keyboard of the computer device.

49 Claims, 3 Drawing Sheets

KEYBOARD ILLUMINATION SYSTEM AND METHOD

BACKGROUND

Computer devices, such as notebook or laptop computers, are increasingly being used in places such as automobiles, planes, classrooms, and outside. However, the surrounding environment is not always a suitable working environment for the computer device, and insufficient lighting conditions further detract from a user's ability to adequately utilize the computer device.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-4 of the drawings, like numerals being used for like and corresponding parts of the various drawings.

Figure 1:
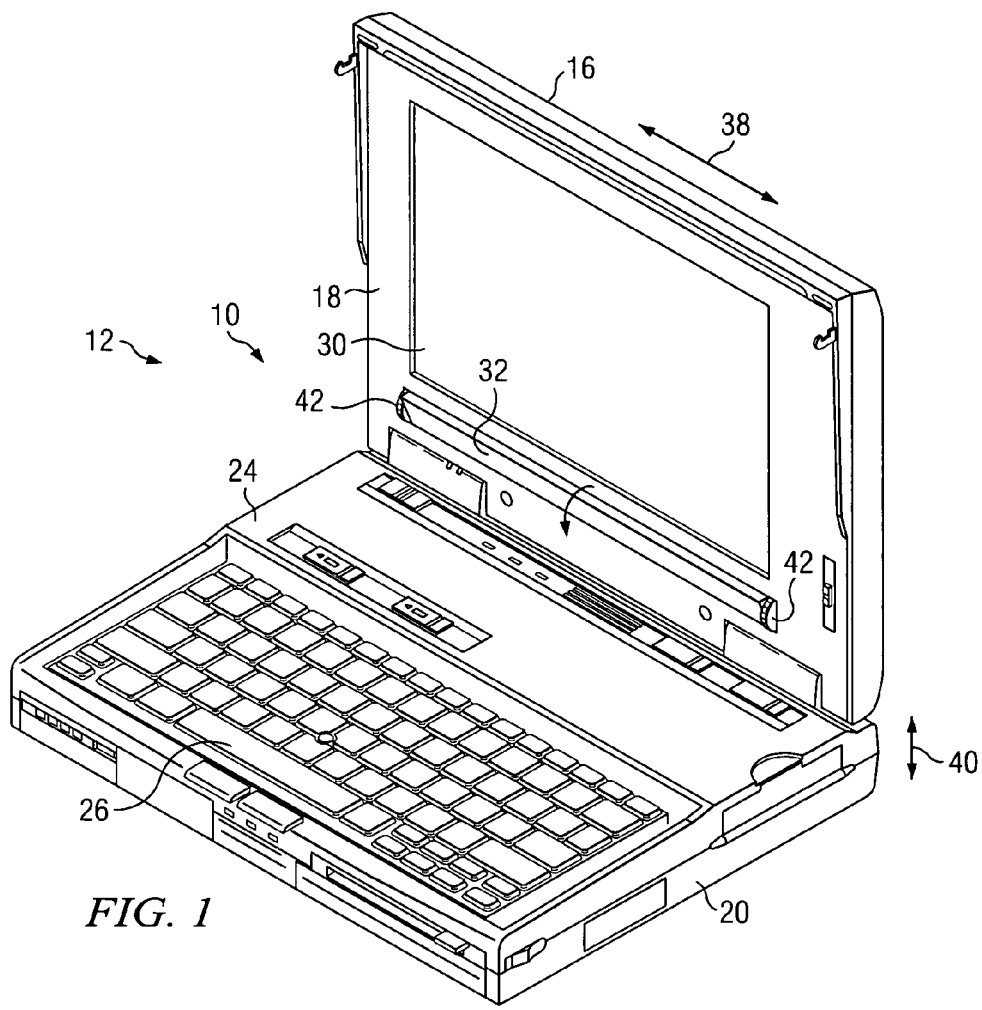
FIG. 1 is a diagram illustrating an embodiment of a keyboard illumination system in accordance with the present invention.

FIG. 1 is a diagram illustrating a computer device 10 in which an embodiment of a keyboard illumination system 12 in accordance with the present invention may be incorporated. In the embodiment illustrated in FIG. 1, computer device 10 comprises a notebook or laptop computer 16 having a display member 18 rotatably coupled to a base member 20. However, it should be understood that computer device 10 may comprise other types of electronic and/or computer device such as, but not limited to, an electronic notepad or personal digital assistant. As illustrated in FIG. 1, base member 20 comprises a working surface 24 having a keyboard 26 disposed thereon. In accordance with the present invention, system 12 is adapted to provide illumination to keyboard 26 in reduced or low-level ambient light conditions. For example, in the embodiment illustrated in FIG. 1, system 12 comprises a primary liquid crystal display (LCD) 30 and a secondary LCD 32 disposed on display member 18. Primary LCD 30 is configured for displaying a desktop, windows, icons, and other images generally associated with computer device 10 (e.g., interacting with and/or otherwise utilizing applications, programs, etc.) to a user. Secondary LCD 32 is adapted to direct light onto at least a portion of keyboard 26 to compensate for reduced ambient light conditions about computer device 10. In the embodiment illustrated in FIG. 1, two LCDs are illustrated; however, it should be understood that a greater quantity of LCDs may be provided (e.g., located on display member 18 or elsewhere on computer device 10).

In the embodiment illustrated in FIG. 1, secondary LCD 32 is disposed between primary LCD 30 and an attachment location of display member 18 to base member 20 such that secondary LCD 32 is disposed proximate or near to keyboard 26 to facilitate illumination of keyboard 26 in reduced ambient light conditions about computer device 10 such that at least a portion of the light emitted by secondary LCD 32 is directed toward or onto keyboard 26. However, it should be understood that secondary LCD 32 may be otherwise located (e.g., on display member 18 or elsewhere) such that secondary LCD 32 is disposed generally above keyboard 26 and/or is otherwise exposed in a location on computer device 10 to direct light onto the upper or user-contacting surface of the elements/keys of keyboard 26. Preferably, secondary LCD 32 extends along a width of display member 18, via a direction indicated generally by 38, a sufficient distance to sufficiently illuminate all portions of keyboard 26. Additionally, secondary LCD 32 is configured having a height, indicated by a direction indicated generally by 40, to provide sufficient lighting to keyboard 26. For example, in some embodiments of the present invention, secondary LCD 32 is configured having a height of approximately 4-6 millimeters; however, it should be understood that the geometric characteristics of secondary LCD 32 may be otherwise configured.

In operation, in response to a reduction or decrease in ambient light conditions about computer device 10, a state of secondary LCD 32 is changed to illuminate keyboard 26. For example, in some embodiments of the present invention, the electrical state of various pixels of secondary LCD 32 are changed to provide illumination from secondary LCD 32 to illuminate keyboard 26 in response to a reduction or decrease in ambient light conditions about computer device 10 or in response to a user request. Additionally, in some embodiments of the present invention, the electrical state of various pixels of secondary LCD 32 may be dynamically changed in response to varying ambient light conditions about computer device 10 such that as ambient light conditions change about computer device 10, the electrical state of various pixels of secondary LCD 32 are changed to increase or decrease the level of illumination provided by secondary LCD 32.

In the embodiment illustrated in FIG. 1, secondary LCD 32 is movably coupled to display member 18 to enable directional control of light emitted by secondary LCD 32. For example, in the embodiment illustrated in FIG. 1, secondary LCD 32 is rotatably coupled to display member 18 about an axis coincident (i.e., coincident or substantially coincident) with the direction indicated by 38 to enable directional control of light emitted by secondary LCD 32 toward keyboard 26. In the embodiment illustrated in FIG. 1, a thumbwheel 42 is disposed at each end of secondary LCD 32 to facilitate movement of secondary LCD 32 by a user. However, it should be understood that other devices or methods may be used to facilitate user-manipulation of secondary LCD 32 to control a direction of light emitted by secondary LCD 32. Thus, in operation, movably coupling secondary LCD 32 to display member 18 enables variable control of a direction of light emitted by secondary LCD 32 by a user of system 10 to direct at least a portion of the light emitted by secondary LCD 32 toward desired portions of keyboard 26. Therefore, embodiments of the present invention enable variable control of the light direction from secondary LCD 32 relative to and/or independent of a position of display member 18 relative to keyboard 26.

Figure 2:
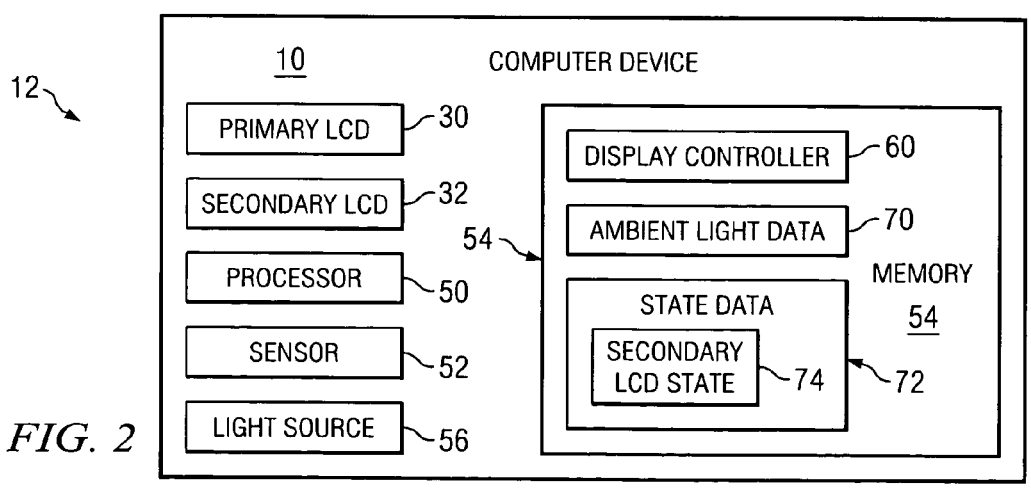
FIG. 2 is a block diagram illustrating an embodiment of a keyboard illumination system in accordance with the present invention.

FIG. 2 is a block diagram illustrating computer device 10 incorporating an embodiment of keyboard illumination system 12 in accordance with the present invention. In the embodiment illustrated in FIG. 2, system 12 comprises a processor 50, a sensor 52, a memory 54, and a light source 56. In the embodiment illustrated in FIG. 2, system 12 also comprises a display controller 60 which may comprise hardware, software, or a combination of hardware and software. In the embodiment illustrated in FIG. 2, display controller 60 is illustrated as being stored in memory 54 so as to be accessible and executable by processor 50.

In operation, sensor 52 measures or otherwise detects ambient light conditions about computer device 10. In some embodiments of the present invention, display controller 60 is adapted to monitor ambient light conditions about computer device 10 via measurements obtained by sensor 52 such that a state of secondary LCD 32 may be changed in response to changes in ambient light conditions about computer device 10. For example, in the embodiment illustrated in FIG. 2, ambient light conditions measured or otherwise detected by sensor 52 are stored in memory 54 as ambient light data 70. Ambient light data 70 may also comprise information associated with an ambient light threshold above or below which a change to the state of secondary LCD 32 is changed corresponding to the change in ambient light conditions about computer device 10. In the embodiment illustrated in FIG. 2, memory 54 also comprises state data 72 having information associated with a state of secondary LCD 32, stored as secondary LCD state 74. For example, secondary LCD state 74 may comprise information associated with the electrical state of pixels of secondary LCD 32 such that the electrical state of various pixels of secondary LCD 32 may be changed to provide a desired or predetermined level of illumination to keyboard 26. Thus, the electrical state of pixels of secondary LCD 32 may correspond to an off condition (e.g., no illumination) to various levels or degrees of illumination. Preferably, system 12 is configured to automatically adjust the state and/or illumination level of LCD 32 based on ambient light conditions. However, it should be understood that system 12 may also be configured, alternatively or additionally, to enable a user to manually adjust the illumination level provided by secondary LCD 32. In the embodiment illustrated in FIG. 2, a single light source 56 is used to illuminate primary LCD 30 and secondary LCD 32. However, it should be understood that additional sources of light may be used to illuminate either primary LCD 30 and/or secondary LCD 32.

Thus, in operation, in some embodiments of the present invention, in response to detecting a change in ambient light conditions about computer device 10, display controller 60 automatically changes an electrical state of secondary LCD 32 to initiate, increase, decrease or terminate an illumination level provided by secondary LCD 32 onto keyboard 26. For example, ambient light conditions measured or otherwise detected by sensor 52 are received by display controller 60 and stored and/or compared to ambient light data 70 to determine whether a change to ambient light conditions about computer device 10 has occurred and/or to determine whether a change in ambient light conditions about computer device 10 exceed a predetermined threshold. Thus, if ambient light conditions about computer device 10 exceed a predetermined threshold as indicated by ambient light data 70, display controller 60 automatically changes an electronic state of pixels of secondary LCD 32 to provide a predetermined level of illumination to keyboard 26. Accordingly, in operation, in response to a decrease or reduction in ambient light conditions about computer device 10, display controller 60 automatically changes or adjusts a state of secondary LCD 32 to activate or increase an illumination level provided by secondary LCD 32 toward keyboard 26. Correspondingly, in response to an increase in ambient light conditions about computer device 10, display controller 60 is configured to decrease an illumination level provided by secondary LCD 32 toward keyboard 20 and/or otherwise place secondary LCD 32 in a hibernation state.

In other embodiments of the present invention, display controller 60 is adapted to receive a user input or request to obtain, maintain and/or otherwise control a desired level of illumination of keyboard 26 via secondary LCD 32. For example, in some embodiments of the present invention, a user may provide an input to display controller 60 via a keyboard, mouse, track pad, or other type of input device associated with computer device 10, to increase or decrease a level of illumination provided by secondary LCD 32 to keyboard 26 and/or maintain or otherwise prevent a change to a level of illumination provided by secondary LCD 32 to keyboard 26.

Figure 3:
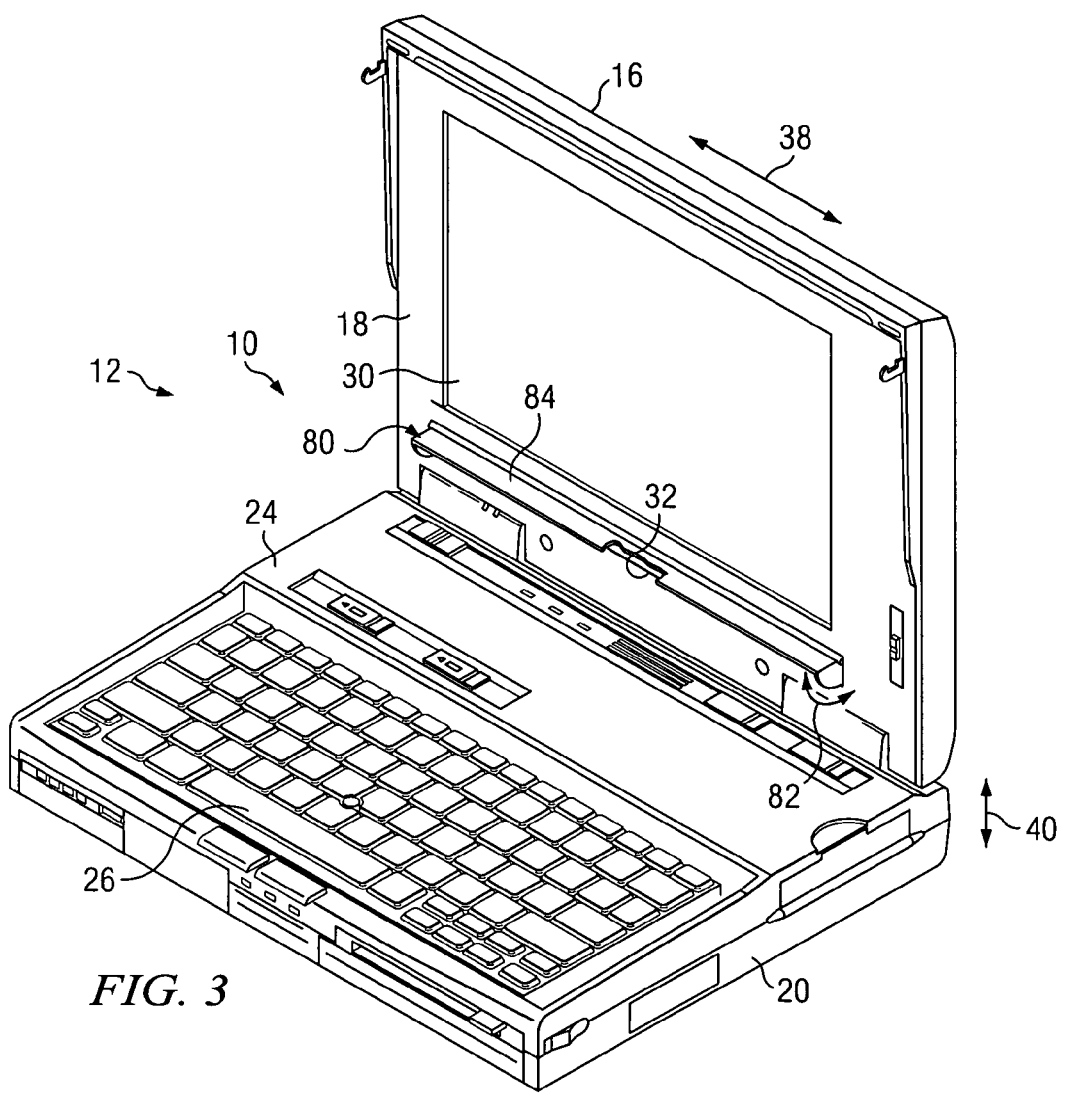
FIG. 3 is a diagram illustrating another embodiment of a keyboard illumination system in accordance with the present invention.

FIG. 3 is a diagram illustrating another embodiment of system 12 in accordance with the present invention. In the embodiment illustrated in FIG. 3, system 12 comprises a retractable awning or shield 80 (a portion of which is broken away for illustrative purposes to illustrate secondary LCD 32 relative thereto) for directing light emitted by secondary LCD 32 toward keyboard 26 and/or shielding or otherwise preventing a glare condition onto LCD 30 resulting from light emitted by LCD 32. For example, in the embodiment illustrated in FIG. 3, shield 80 is rotatably coupled to display member 18 such that shield 80 is rotatable in the directions indicated generally by 82 relative to LCD 32 and/or display member 18. Thus, in an extended position, as illustrated in FIG. 3, shield 80 comprises a member 84 adapted to be extended outwardly between LCDs 30 and 32, thereby preventing and/or reducing the likelihood of glare onto LCD 30 by light emitted by LCD 32 and/or directing light emitted by LCD 32 toward keyboard 26. Correspondingly, in a retracted position, shield 80 may be used to prevent and/or otherwise block light from being emitted by LCD 32 onto keyboard 26 and/or protect LCD 32 when display element 18 is a closed position relative to base member 20. For example, preferably, in a retracted position, shield 80 is disposed even or flush with a surface of display member 18 disposed against or otherwise towards base member 20 when display member 18 is in a closed position relative to base member 20. However, it should be understood that other devices and/or methods be used to prevent and/or reduce the likelihood of glare onto LCD 30 by light emitted by LCD 32 and/or direct or otherwise focus light emitted by LCD 32 toward keyboard 26.

Figure 4:
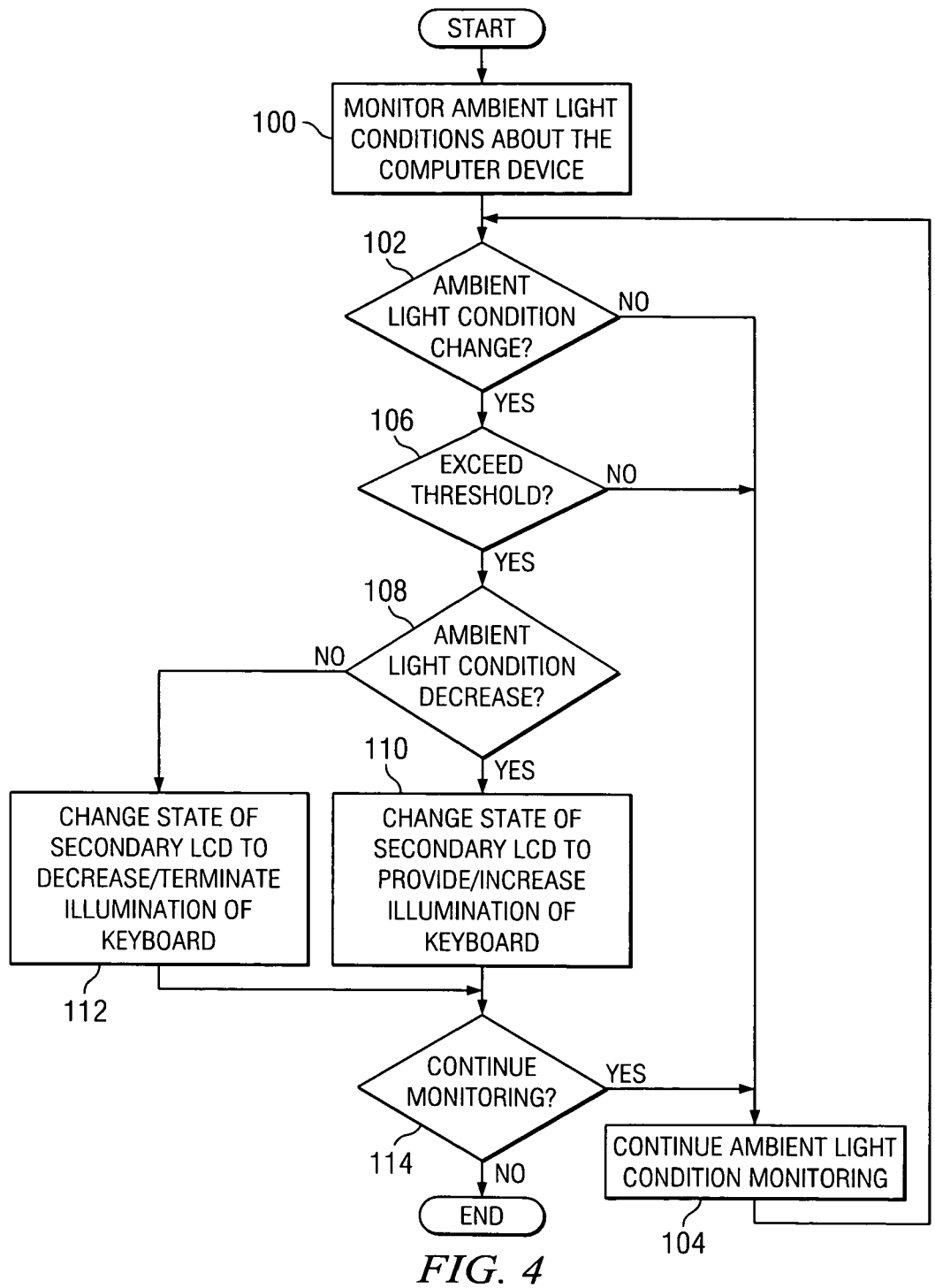
FIG. 4 is a flow diagram illustrating an embodiment of a keyboard illumination method in accordance with the present invention.

FIG. 4 is a flow diagram illustrating an embodiment of a keyboard illumination method in accordance with the present invention. The method begins at block 100, where display controller 60 monitors ambient light conditions about computer device 10. At decisional block 102, a determination is made whether a change to ambient light conditions about computer device 10 has occurred. If a change to ambient light conditions about computer device 10 has not occurred, the method proceeds to block 104, where display controller 60 continues monitoring ambient light conditions about computer device 10. If ambient light conditions about computer device 10 have changed, the method proceeds to decisional block 106.

At decisional block 106, a determination is made whether a change in ambient light conditions about computer device 10 has exceeded a predetermined threshold. For example, in operation, display controller 60 accesses ambient light date 70 to identify or otherwise determine a threshold value beyond which a decrease or increase in an illumination level provided by secondary LCD 32 is desired. If the change in ambient light conditions about computer device 10 has not exceeded a predetermined threshold, the method proceeds to block 104, where display controller 60 continues monitoring ambient light conditions about computer device 10. If the change in ambient light conditions about computer device 10 has exceeded the predetermined threshold, the method proceeds to decisional block 108, where a determination is made whether the ambient light conditions about computer device 10 have decreased. If ambient light conditions about computer device 10 have decreased, the method proceeds to block 110, where display controller 60 changes a state of secondary LCD 32 to provide and/or increase a level of illumination of keyboard 26. For example, in operation, display controller 60 accesses secondary LCD state 74 information to determine the electrical state of pixels of secondary LCD 32 and changes the electrical state of various pixels of secondary LCD 32 to provide a desired or predetermined level of illumination to keyboard 26. If ambient light conditions about computer device 10 have increased, the method proceeds from decisional block 108 to block 112, where display controller 60 changes a state of secondary LCD 32 to decrease and/or terminate illumination of keyboard 26 provided by secondary LCD 32. The method proceeds to decisional block 114, where determination is made whether continued ambient light condition monitoring is desired. For example, in some embodiments of the present invention, display controller 60 is adapted to continue monitoring ambient light conditions about computer device 10 while computer device 10 is in an "on" condition. If continued monitoring of ambient light conditions about computer device 10 is desired, the method proceeds to block 104, where display controller 60 continues monitoring ambient light conditions about computer device 10. If continued monitoring of ambient light conditions about computer device 10 is not desired, the method ends.

Thus, embodiments of the present invention provide a secondary LCD for illuminating a keyboard of a computer device. In some embodiments of the present invention, dynamic illumination control of the keyboard is provided in response to changes in ambient light conditions about the computer device by dynamic control of the electrical state of various pixels of the secondary LCD. It should be understood that in the embodiment of the method of the present invention described in FIG. 4, certain functions may be omitted, combined, or accomplished in a sequence different than depicted in FIG. 4. Also, it should be understood that the method depicted in FIG. 4 may be altered to encompass any of the other features or aspects described elsewhere in the specification.

What is claimed is:

1. A keyboard illumination system, comprising:
    a computer device having a plurality of liquid crystal displays (LCDs); and
    a display controller adapted to change an electrical state of at least one of the LCDs for providing a predetermined level of illumination by the at least one LCD for illuminating at least a portion of a keyboard of the computer device, wherein the at least one LCD is adapted to enable variable control of a direction of light emitted by the at least one LCD.

2. The system of claim 1, wherein the plurality of LCDs are disposed on a display member of the computer device.

3. The system of claim 1, wherein the display controller is adapted to change the electrical state of the at least one LCD in response to a change in an ambient light condition about the computer device.

4. The system of claim 1, wherein the display controller is adapted to automatically change the electrical state of the at least one LCD.

5. The system of claim 1, wherein the display controller is adapted to monitor ambient light conditions about the computer device.

6. The system of claim 1, further comprising a sensor adapted to detect an ambient light condition about the computer device.

7. The system of claim 1, wherein the display controller is adapted to change the electrical state of the at least one LCD in response to a decrease of ambient light about the computer device.

8. The system of claim 1, wherein the display controller is adapted to receive a user request to change the electrical state of the at least one LCD.

9. The system of claim 1, wherein the computer device comprises a display member rotatably coupled to a base member, wherein at least two of the plurality of LCDs are disposed on the display member.

10. The system of claim 1, wherein the at least one LCD is movably coupled to a display member.

11. The system of claim 1, further comprising a shield adapted to direct light emitted by the at least one LCD toward the keyboard.

12. A keyboard illumination system, comprising:
    a plurality of liquid crystal display (LCD) means disposed on a computer device; and
    means for changing an electrical state of at least one the LCDs for providing a predetermined level of illumination by the at least one LCD for illuminating at least a portion of a keyboard of the computer device, wherein the at least one LCD is movably coupled to a display member.

13. The system of claim 12, wherein the changing means comprises means for changing the electrical state of the at least one LCD in response to a change in an ambient light condition about the computer device.

14. The system of claim 12, wherein the changing means comprises means for changing the electrical state of the at least one LCD in response to a decrease in ambient light about the computer device.

15. The system of claim 12, further comprising means for enabling variable control of a direction of the light emitted by the at least one LCD relative to the keyboard.

16. The system of claim 12, wherein the changing means comprises means for receiving a user request to change the electrical state of the at least one LCD.

17. A keyboard illumination method, comprising:
    determining an ambient light condition about a computer device; and
    changing an electrical state of at least one of a plurality of liquid crystal displays (LCDs) of the computer device to provide a predetermined level of illumination by the at least one LCD for illuminating at least a portion of a keyboard of the computer device, wherein the at least one LCD is adapted to enable variable control of a direction of light emitted by the at least one LCD.

18. The method of claim 17, further comprising monitoring the ambient light condition about the computer device.

19. The method of claim 17, wherein changing the electrical state of the at least one LCD comprises automatically changing the state of the at least one LCD.

20. The method of claim 17, wherein changing the electrical state of the at least one LCD comprises changing the electrical state of the at least one LCD in response to a decrease in the ambient light condition about the computer device.

21. The method of claim 17, further comprising receiving a user request to change the electrical state of the at least one LCD.

22. The method of claim 17, further comprising determining whether the change in the ambient light condition exceeds a predetermined threshold.

23. A method for producing a computer device, comprising:
providing a plurality of liquid crystal displays (LCDs); and
providing a display controller adapted to change an electrical state of at least one of the LCDs to provide a predetermined level of illumination by the at least one LCD for illuminating at least a portion of a keyboard of the computer device, wherein the at least one LCD is movably coupled to a display member.

24. The method of claim 23, further comprising providing a sensor adapted to detect an ambient light condition about the computer device.

25. The method of 24, wherein providing a display controller comprises providing a display controller adapted to change the electrical state of at least one of the LCDs in response to detecting a decrease in the ambient light condition.

26. The method of claim 23, wherein providing a display controller comprises providing a display controller adapted to automatically change the electrical state of the at least one LCD.

27. The method of claim 23, wherein providing a display controller comprises providing a display controller adapted to change the electrical state of the at least one LCD in response to receiving a user request to change the electrical state.

28. The method of claim 23, wherein providing a display controller comprises providing a display controller adapted to monitor an ambient light condition about the computer device.

29. A method for producing a computer device, comprising:
providing a first liquid crystal display (LCD) on a display member for displaying an image to a user of the computer device; and
providing a second LCD adapted to provide a predetermined level of illumination for illuminating at least a portion of a keyboard of the computer device based on an ambient light condition about the computer device, wherein the at least one LCD is adapted to enable variable control of a direction of light emitted by the at least one LCD.

30. The method of claim 29, further comprising providing a display controller adapted to change an electrical state of the second LCD in response to a change in the ambient light condition.

31. The method of claim 29, further comprising providing a display controller adapted to automatically change an electrical state of the second LCD to provide a predetermined level of illumination by the second LCD.

32. The method of claim 29, further comprising providing a display controller adapted to monitor the ambient light condition.

33. The method of claim 29, further comprising providing a display controller adapted to receive a user request to change an electrical state of the second LCD.

34. The method of claim 29, wherein providing the second LCD comprises providing the second LCD on the display member.

35. The method of claim 29, wherein providing the second LCD comprises providing the second LCD rotatably coupled to the display member.

36. The method of claim 29, further comprising providing a shield adapted to direct light emitted by the second LCD toward the keyboard.

37. A keyboard illumination system for a computer device, comprising:
a first liquid crystal display (LCD) disposed on a display member of the computer device and adapted to display an image to a user of the computer device;
a second LCD disposed for providing a predetermined level of illumination for illuminating at least a portion of a keyboard of the computer device based on an ambient light condition about the computer device; and
a shield adapted to direct light emitted by the at least one LCD toward the keyboard.

38. The system of claim 37, further comprising a display controller adapted to automatically change an electrical state of the second LCD in response to a change in the ambient light condition.

39. The system of claim 37, further comprising a display controller adapted to automatically change an electrical state of the second LCD to provide the predetermined level of illumination.

40. The system of claim 37, further comprising a display controller adapted to monitor the ambient light condition about the computer device.

41. The system of claim 37, further comprising a sensor adapted to detect the ambient light condition about the computer device.

42. The system of claim 37, further comprising a display controller adapted to receive a user request to change an electrical state of the second LCD.

43. The system of claim 37, wherein the second LCD is rotatably coupled to the display member.

44. The system of claim 37, wherein the second LCD is coupled to the display member to enable directional control of light emitted by the second LCD relative to the display member.

45. A keyboard illumination system, comprising:
a display member of a computer device having at least one liquid crystal display (LCD) disposed thereon, the at least one LCD movably coupled to the display member to enable at least a portion of light emitted by the at least one LCD to be directed toward a keyboard of the computer device.

46. The system of claim 45, wherein the at least one LCD is rotatably coupled to the display member.

47. The system of claim 45, wherein the at least one LCD is disposed proximate to the keyboard.

48. The system of claim 45, further comprising a display controller adapted to change an electrical state of the at least one LCD in response to a change in an ambient light condition about the computer device.

49. The system of claim 45, further comprising a display controller adapted to receive a user request to change an illumination level provided by the at least one LCD.

* * * * *

UNITED STATES PATENT AND TRADEMARK OFFICE
CERTIFICATE OF CORRECTION

| | | |
|---|---|---|
| PATENT NO. | : 7,385,588 B2 | Page 1 of 1 |
| APPLICATION NO. | : 11/044776 | |
| DATED | : June 10, 2008 | |
| INVENTOR(S) | : Quintin T. Phillips et al. | |

It is certified that error appears in the above-identified patent and that said Letters Patent is hereby corrected as shown below:

In column 6, line 33, in Claim 12, after "one" insert -- of --.

In column 7, line 25, in Claim 25, after "of" insert -- claim --.

Signed and Sealed this

Twenty-first Day of October, 2008

JON W. DUDAS
*Director of the United States Patent and Trademark Office*